March 23, 1971  S. J. HOFFMAN  3,572,409
SABER SAW
Filed Dec. 13, 1967  3 Sheets-Sheet 1
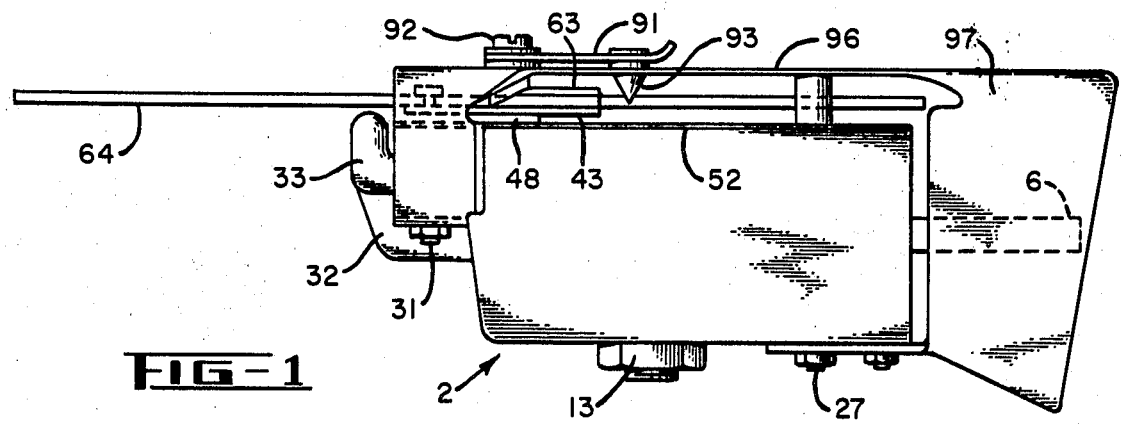
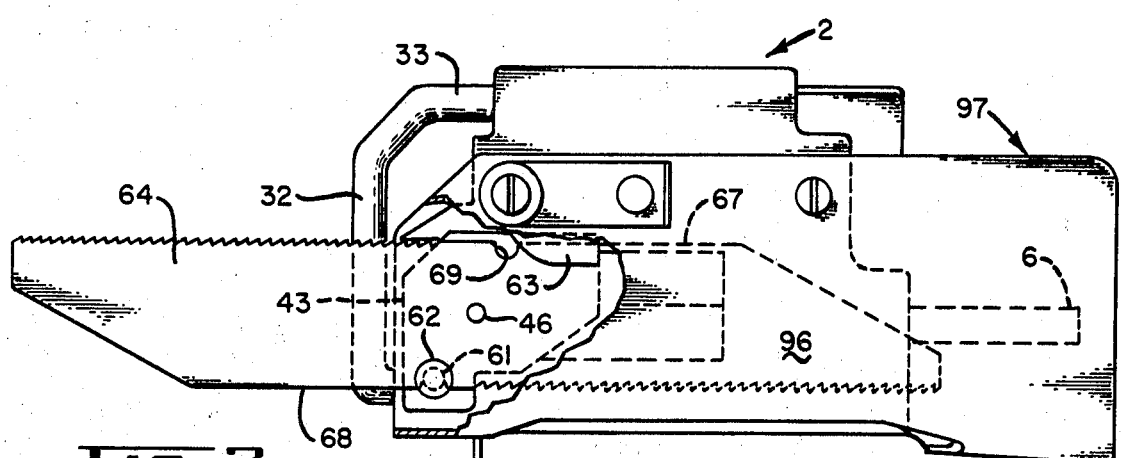
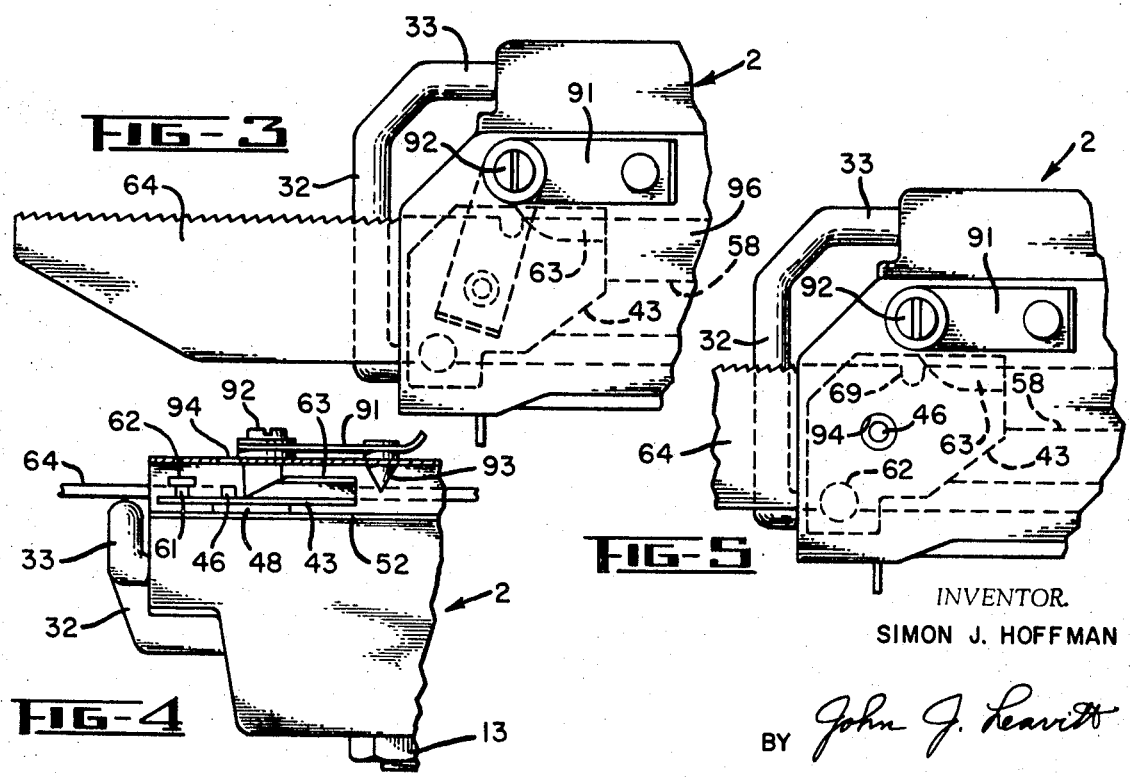
INVENTOR.
SIMON J. HOFFMAN
BY John J. Leavitt March 23, 1971     S. J. HOFFMAN     3,572,409
SABER SAW
Filed Dec. 13, 1967     3 Sheets-Sheet 2
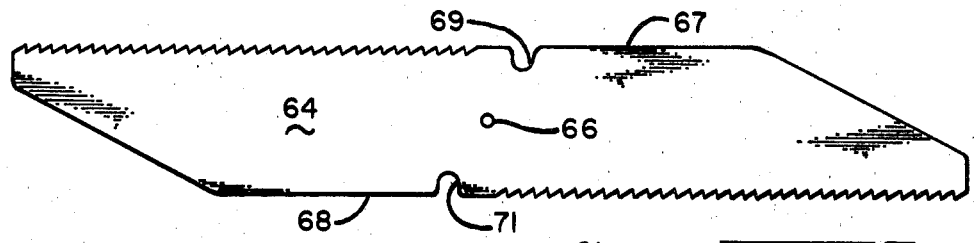
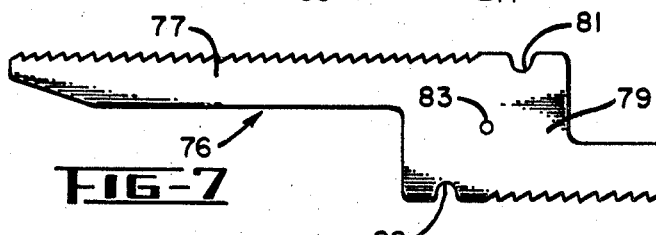
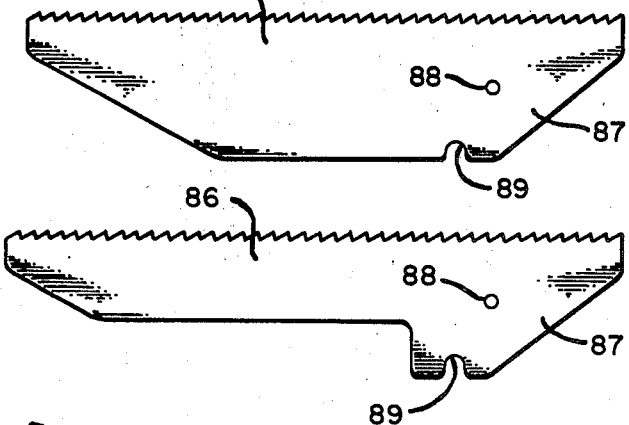
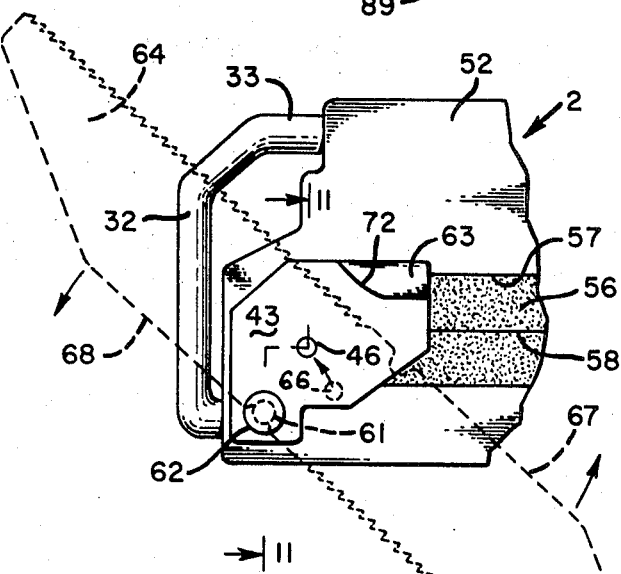
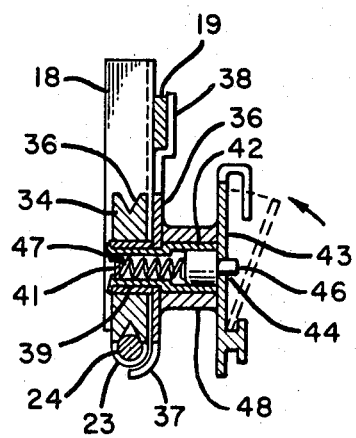
INVENTOR.
SIMON J. HOFFMAN
BY *John J. Leavitt*

March 23, 1971  S. J. HOFFMAN  3,572,409
SABER SAW
Filed Dec. 13, 1967  3 Sheets-Sheet 3
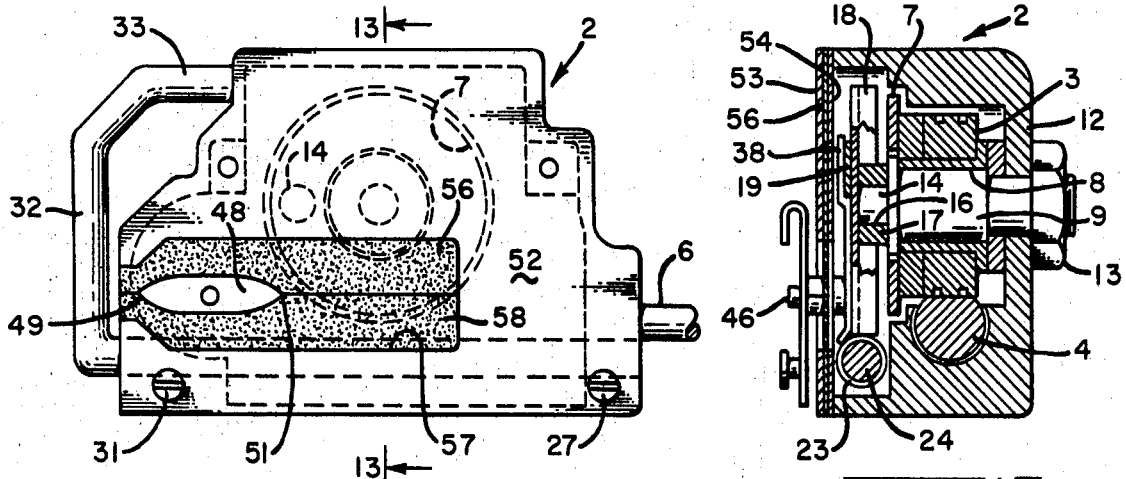
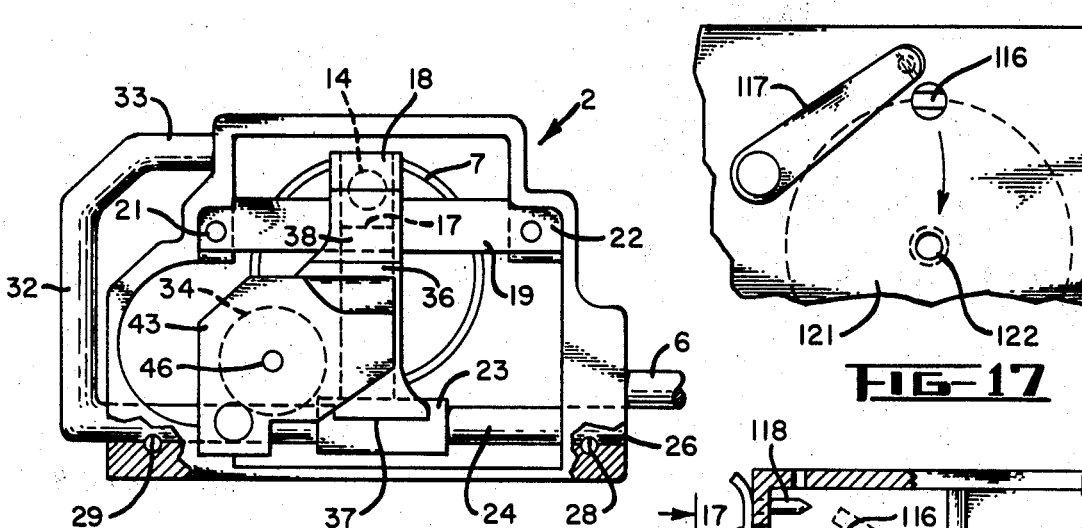
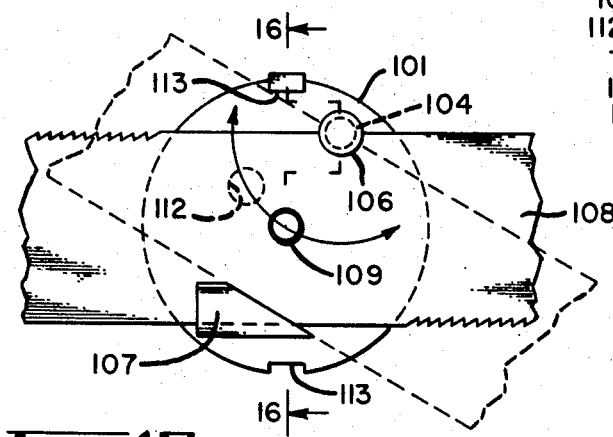
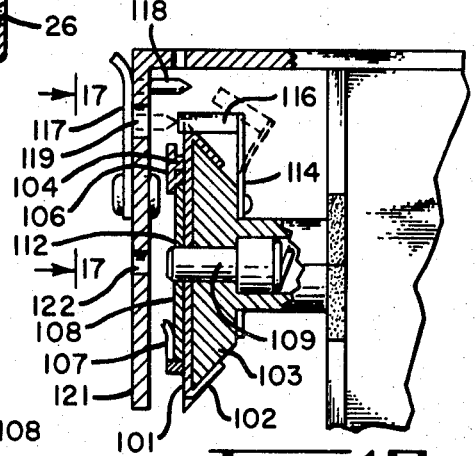
INVENTOR.
SIMON J. HOFFMAN
BY John J. Leavitt United States Patent Office 3,572,409
Patented Mar. 23, 1971

3,572,409
SABER SAW
Simon J. Hoffman, 13115 E. Jefferson St.,
Detroit, Mich. 48215
Filed Dec. 13, 1967, Ser. No. 690,265
Int. Cl. B27b *19/08*
U.S. Cl. 143—68      7 Claims

ABSTRACT OF THE DISCLOSURE

A saber saw device for attachment to a standard drill motor converts the rotary motion of the drill motor to reciprocating motion of a saw blade. The blade is locked to the reciprocable mechanism in a manner to prevent inadvertent disengagement of the blade while the saw is in operation. The blade and reciprocable mechanism are compatibly designed so that either a single ended or double ended blade may be mounted on the driving mechanism.

BACKGROUND OF INVENTION

The invention relates to reciprocating saw devices, and particularly to a novel blade for such a saw, a novel method of attachment of the blade to the mechanism which effects reciprocation of the blade, and to a novel reciprocating mechanism for the blade adapted to be attached to a standard drill motor.

Saber saw devices perform a cutting operation on metal or wood, and combine a relatively stiff-toothed blade with a mechanism for reciprocating the blade in order to do the cutting. One of the problems with such devices has been the vibration and jarring effect of the reciprocating motor. It is accordingly one of the objects of the present invention to provide a driving mechanism for a saber saw device in which vibration has been substantially eliminated.

The blade of a saber saw is reciprocated many hundreds of times per minute by the driving mechanism and as a consequence of the seemingly inherent vibrations set up by the driving mechanism, there is a tendency for the blade to become dislodged or detached from the driving motor during operation. This creates a hazardous condition because of the extremely rapid reciprocation of the blade. It is accordingly another object of the invention to provide a lock mechanism for the blade which will prevent its being disengaged inadvertently during operation.

When being used by an inexperienced person, it often happens that the blade of the saber saw is broken. This renders the device unusable unless the operator has another blade which he can substitute for the broken one. It is accordingly a still further object of the present invention to provide a novel saber saw blade which is reversible in the driving mechanism so that if one portion of the blade is broken the opposite end may be substituted therefor.

The driving mechanism for a saber jaw is in many instances self-contained; i.e., it has its own motor. This makes the device relatively expensive and in many cases prevents its purchase by people of limited means. Accordingly, it is a still further object of the invention to provide a relatively inexpensive driving mechanism which may be utilized in conjunction with a standard drill motor.

In the use of a saber saw, whether it is used for wood or for metal, one of the problems is the tendency of wood or metal chips to be drawn into the driving mechanism. Therefore, a still further object of the invention is to provide a driving mechanism for a saber saw which incorporates means for sealing the driving mechanism against the entry of chips.

Regardless of the type of driving mechanism for a reciprocating saw blade, it is helpful to have available a double-ended blade, either end of which may be quickly placed into operative position without the necessity of removal of the blade from the reciprocating drive member. It is therefore another object of this invention to provide a selectively rotatable platen on which a reciprocable saw blade may be detachably mounted.

The invention possesses other objects and features of advantage, some of which, with the foregoing, will be apparent from the following description and the drawings. It is to be understood however that the invention is not limited to the embodiment illustrated and described, as it may be embodied in various forms within the scope of the appended claims.

SUMMARY OF INVENTION

In terms of broad inclusion, the saber saw device of the invention may be regarded in three different but related aspects. In one of its aspects the invention involves the provision of a novel reciprocating drive mechanism for a saber saw blade. In another of its aspects, the invention involves a novel blade useful with the novel drive mechanism of the instant design; and in its third aspect the invention involves the manner and means of detachably mounting the blade to the reciprocating drive mechanism.

BRIEF DESCRIPTION OF DRAWINGS

FIG. 1 is a top plan view in elevation.

FIG. 2 is a side elevation of the saber saw device with a portion of the shield structure broken away to disclose the underlying parts.

FIG. 3 is a fragmentary side elevational view similar to FIG. 2, but showing in dash lines the blade release member swung into position to release the blade.

FIG. 4 is a fragmentary plan view similar to FIG. 1, but with a portion of the shield structure broken away to disclosure the underlying parts.

FIG. 5 is a fragmentary elevation similar to FIG. 3, and illustrating the aperture in the shield member through which the blade release pin extends to release the blade from its support.

FIG. 6 illustrates one embodiment of a double ended blade suitable for use in the drive mechanism shown in FIGS. 1 through 5.

FIG. 7 is an illustration of a modified double ended blade, illustrating that either or both ends of the blade may be thinned considerably to permit cutting short radiuses.

FIG. 8 is another embodiment of the type of blade capable of being used in the drive mechanism.

FIG. 9 is a still further illustration of a different blade design.

FIG. 10 is a fragmentary side elevation illustrating the position of the blade just prior to rotation in the direction of the arrows to effect locking of the blade on its carrier member.

FIG. 11 is a vertical sectional view taken in the plane indicated by the line 11—11 in FIG. 10. This figure illustrates in dash lines the positional relationship between the blade and its carrier member just prior to rotation of the blade to bring it into locking position.

FIG. 12 is a side elevational view of the reciprocating drive mechanism, shown with the shield structure and blade carrier member removed to disclose the means by which chips are prevented from entering into the mechanism.

FIG. 13 is a vertical sectional view taken in the plane indicated by the line 13—13 in FIG. 12.

FIG. 14 is a side elevational view, partly in section, with the side cover plate of the drive mechanism removed to disclose the underlying structure.

FIG. 15 is a side elevational view of a modified embodiment of the blade carrier mechanism.

FIG. 16 is a vertical sectional view taken in the plane indicated by the line 16—16 in FIG. 15.

FIG. 17 is a side elevational view taken in the direction indicated by the arrow 17 in FIG. 16.

DESCRIPTION OF PREFERRED EMBODIMENT

In terms of greater detail, the saber saw device of the invention comprises a housing member 2, preferably fabricated from cast aluminum of relatively heavy cross-section, and having a hollow interior as shown best in FIGS. 13 and 14. Appropriately journaled within the hollow housing is a helically-toothed worm gear 3, driven by a helical worm 4 also suitably journaled in the housing member 2. Attached to the worm 4 is an elongated drive stem 6 which projects out of the hollow housing for suitable attachment to a drill motor (not shown). The worm gear 3 is provided with a face plate 7, and a suitable bronze bearing 8 rotatably disposed on stud shaft 9, secured to the wall 12 of the housing member 2 by an appropriate nut 13. A cylindrical lug 14 is brazed on the face plate 7 adjacent its outer periphery and is adapted to rotatably engage the central bore 16 of a slide member 17. Because of its placement adjacent to the outer periphery of the face plate 7, lug 14 will be observed to follow a circular path upon rotation of the worm gear 3 and attached face plate 7. The radius of such circular path is equal to the distance between the axis of rotation of the worm gear 3 and the central axis of the lug 14.

In order to translate the circular motion of the lug 14 into linear reciprocatory motion, the slide member 17 is slidably disposed within a vertically disposed channel member 18, shown best in FIGS. 13 and 14, so that upon circular rotation of lug 14, the slide member 17 is caused to reciprocate longitudinally within the channel member 18. However, since lug 14 shifts its position transversely with respect to channel member 18, it will be observed that in order to enable reciprocating movement of slide member 17, the channel member 18 must also follow the transverse movement of lug 14. In order to effect such transverse movement of channel member 18, one end thereof is slidably guided along a bar member 19, the opposite ends 21 and 22 of which are suitably seated within shoulders formed in the housing member 2 and secured thereto in a manner which will hereinafter be explained.

The other end of channel member 18 is rigidly brazed to a tubular slide bearing 23 having an axis that extends perpendicular to the longitudinal axis of channel member 18, and which is adapted to slidably engage a guiding and support rod 24 as shown best in FIGS. 13 and 14. The guide rod 24 has one end portion 26 thereof detachably locked to the housing member 2 by a screw 27 (FIG. 12) which passes through the housing member 2 and engages a notch 28 (FIG. 14) formed in the rod 24. Intermediate its ends, the rod 24 is provided with a second notch 29 (FIG. 14) which is suitably engaged by a screw 31 (FIG. 12) which passes through the opposite corner of the housing member 2 from the screw 27. From this intermediate position of the rod, the rod extends outside of the housing in an abutment portion 32. The other end portion 33 of the rod is bent back so that it lies parallel to the portion 24 of the rod, and is inserted in an appropriate aperture formed in the housing member 2.

To insure that there is no binding of channel member 18 on slide bar 19 and rod 24, the reciprocating channel member 18 is further supported and given stability by a rotatable wheel 34 (FIGS. 11 and 14) journaled on a plate extension 36, one end 37 of which extends downwardly and is brazed to the tubular bearing member 23, while its opposite end is jogged to provide a flange 38 between which and the channel member 18 the bar 19 is slidably interposed. The wheel 34 is provided with a V-groove as at 36 which rollably engages the rod 24 as shown best in FIG. 11. It will thus be seen that through the cooperation of bar 19, rod 24 and bearing member 23 thereon and wheel 34, the reciprocating channel member 18 is precluded from binding due to any transverse thrust imposed upon it by circular rotation of lug 14.

As shown best in FIG. 11, the wheel 34 is rotatably journaled on the plate 36 by a tubular stud shaft member 39, closed at one end by a plate 41, and at its other end 42 enlarged in diameter as shown to provide a shoulder bearing against plate 36. The open end of enlarged portion 42 is butted against a transversely extending plate 43 constituting a support platen for attachment of the saber saw blade to the driving mechanism. The plate 43 is provided with a central aperture 44, through which projects a lock pin 46 resiliently retained in position by coil spring 47 working between plate 41 and an enlarged end-portion of lock pin 46. The tubular bearing portion 42 is surrounded and embedded in a member 48 of relatively heavy cross-section disposed between the plate 36 and platen 43. As shown best in FIG. 12, the heavy cross-sectional member 48 is provided at opposite ends with relatively sharp chisel-shaped edges as at 49 and 51. The chisel-shaped edges function in a manner which will hereinafter be explained.

Closing the housing member 2 is a cover plate 52, shown best in FIGS. 12 and 13. The cover plate is conveniently fabricated as a three-part composite structure or assembly, including an outside closure member or cover plate 53, preferably fabricated from sheet aluminum and configured to conform to the outline of the housing member 2. Underlying and secured to the cover plate 53 is a retention plate 54, between which and the cover plate 53 is sandwiched a sheet of polyurethane 56 or other flexible material. The cover plate 53 and retention plate 54 are apertured as shown best at 57 in FIG. 12; but the polyurethane sheet 56 extends across the aperture and is provided with a slit 58 as shown. The heavy cross-section support member 48 which functions to support the platen 43 extends through the slit 58 in the flexible polyurethane member 56, and the relatively sharp chisel-edges 49 and 51 serve to displace the opposed edges of the polyurethane sheet transversely of the direction of motion of the platen 43. It will thus be seen that upon reciprocating motion of the sharpened member 48, the flexible polyurethane sheet falls together behind it so as to preclude the entrance of chips into the reciprocating mechanism. In other words, the flexible sheet 56 functions as a curtain which permits passage therethrough of the heavy support member 48, but which closes immediately behind the moving member.

As shown best in FIGS. 2, 4, 11 and 13, the blade-supporting platen 43 is provided adjacent one of its edges with a lug 61 having a head 62 thereon. Adjacent its opposite peripheral edge portion the plate 43 is rolled over to provide a tab 63 lying parallel to the plate 43 but spaced therefrom a small amount to provide for the interposition therebetween of a saw blade 64. The saw blade 64, as shown in FIGS. 1, 2, 3 and 4, is similar to the embodiment illustrated in FIG. 6, which shows a full length blade having opposed ends of similar configuration and having a centrally disposed aperture 66 adapted to be engaged by the lock pin 46 which projects through the plate 43. Formed in opposite edges 67 and 68 of the saw blade 64 are notches 69 and 71, respectively, the notches 69 and 71 and the central aperture 66 in the blade being in alignment or lying along a common axis.

To detachably engage the blade 64 to its carrier member or platen 43, as shown best in FIGS. 10 and 11, the blade is positioned so that the notch 71 engages the shank of lug 61. The blade is inserted so that the long edge 67 of the blade lies substantially parallel to an inclined edge 72 formed on flange 63. With the blade in the position shown in FIG. 10, the blade is pressed inwardly against the resilience imposed by spring 47 on pin 46, until the edge 67 of the blade passes beyond the edge 72. The blade may now be rotated in the direction indicated by the arrows in FIG. 10, using the shank of stud 61 as a fulcrum, until the upper edge 67 of the blade becomes engaged behind the flange 63. From an examination of FIG. 10 it will be noted that with the blade in the inclined position shown in that figure, he centrally disposed aperture 66 in the blade lies transversely displaced from the pin 46. With rotation of the blade about shank 61, the centrally disposed aperture 66 is swung into indexing relationship with the lock pin 46. When the upper edge 67 of the blade has become lodged behind flange 63, it will be found that the pin 46 will snap into the centrally disposed aperture 66 in the blade. The blade in this locked position, as shown best in FIG. 2, lies detachably locked behind the head 62 of lug 61, and behind the flange 63. The shank of lug 61, cooperating with the notch 71, prevents longitudinal movement of the blade with respect to the actuating mechanism, while thhe head 62 of lug 61 and flange 63 prevent lateral displacement of the blade with respect to its direction of motion during operation. Additionally, insertion of the pin 46 in the central aperture 66 of the blade prevents rotation of the blade as would be required to disengage the edge 67 from behind flange 63. Accordingly, the blade 64 is securely yet removably attached to the plate member 43.

In FIGS. 7, 8 and 9, there are shown different embodiments of blades which may be used with the actuating mechanism described above. The blade 76 shown in FIG. 7 is provided with opposed blade portions 77 and 78 having a transverse width substantially less than the width of the blade 64. Such a narrow blade has the advantage of being able to be used to cut relatively short radiuses. Each of the blade portions 77 and 78 extend in opposite directions from a centrally disposed body portion 79 of the blade, one edge of which is provided with a notch 81 similar to the notch 69 in blade 64, while the other edge portion of the body is provided with a notch 82 similar to the notch 71 in blade 64. As shown in the drawing, the notches 81 and 82 bear the same relationship to the central aperture 83 in blade 76 as exists between corresponding elements in blade 64.

The blades 84 and 86 illustrated in FIGS. 8 and 9, respectively, are each provided with a central body portion 87, a central aperture 88, and a notch 89 formed along one longitudinal edge in the body portion of the blade. Each of these blades is attached to the blade-supporting plate 43 in the same manner as blades 64 and 76. The difference between the blade shown in FIG. 8 and the blade shown in FIG. 9 is that the cutting portion of the blade 86 of FIG. 9 is of less width than the blade 84 in FIG. 8.

In the constructon of the device shown in FIGS. 1 through 14, in order to substitute one end of the blade for the other on the device, it is necessary to remove the blade and reinsert it and re-lock it in position with the opposite end of the blade projecting as in FIGS. 1 and 2. To facilitate this operation (FIGS. 1 through 3) there is provided a spring finger 91, pivotally supported on a screw 92 which functions also to retain the cover plate 52 in position. The spring finger 91 is equipped with an extending lock-release portion 93 adapted to be inserted through an aperture 94 (FIG. 5) and placed in contact against the end of lock pin 46. The aperture 94 is formed in the side member 96 of a guard and cover plate 97 as shown best in FIGS. 1 and 2. The spring finger 91 is shown in dash lines in FIG. 3 in position to release the lock pin 46 from the blade. It will thus be seen that upon depression of the spring pressed lock pin 46, the saw blade may be rotated in order to swing the upper edge portion 67 of blade 64, for instance, from under the flange 63, thus permitting the blade to be removed.

In the construction of the device shown in FIGS. 15, 16 and 17, the platen 43 shown in FIGS. 1 through 14 is modified in order to permit rotation of the blade end-for-end without removing the blade from the support member. Referrng specifically to FIGS. 15 and 16, it will be seen that the blade-support platen 101 is provided with a peripheral flange portion 102 which is spun over the edge portion of a carrier member 103. The edge portion of the carrier 103 over which the flange 102 is spun is conveniently conically shaped as shown in order to permit rotation of the platen 101 on the support member 103. As with platen 43, the platen 101 is provided with a lug 104, having a head 106. Additionally, as with platen 43, the platen 101 is provided with a flange 107 which cooperates with the platen 101 to lock the blade 108 in position on the platen. As before, a spring-pressed detent or locked pin 109 engages a central aperture 112 shown in dash lines in FIG. 15. To lock the platen 101 against rotation on its supporting member 103, opposite peripheral edges of the platen 101 are provided with notches 113 as shown best in FIGS. 15 and 16, and the supporting member 103 is provided with a spring arm 114, shown best in FIG. 16, on the end of which there is a lock lug 116 adapted to engage the notches 113 as they are brought into registry with the lug 116. It will thus be seen that in order to rotate the blade 108 end-for-end, the lock pin release lever 117 (FIG. 16) is swung in an arc as shown by the arrow in FIG. 17, to cause a lock-pin release-lug 118 to extend through aperture 119 in an appropriate cover plate 121. When the lock lug 116 has been sprung back into the position shown in dash lines in FIG. 16, the saw blade may be rotated freely with the platen 101 on the support member 103. As with the other embodiments, it is possible to remove the saw blade 108 from the platen 101 by swinging the spring lever 117 so as to bring the lug 118 into registry with the aperture 122 in the cover plate 121 so that the lug 118 may impinge against the spring-pressed lock pin 109. Depressing the spring-pressed lock pin enables rotation of the saw blade about lug 104 as a center of rotation so as to swing the edge of the saw blade out from under flange 107.

I claim:

1. A drive mechanism for effecting reciprocation of a saber saw blade by converting rotary motion to controlled linearly directed reciprocatory motion of the saw blade comprising:

(a) a housing at least one wall of which is apertured;
   (b) a worm gear journaled for rotation within the housing about an axis of rotation;
   (c) a worm journaled for rotation within the housing about an axis perpendicular to the axis of rotation of the worm gear and meshed with the worm gear to effect rotation of the worm gear upon rotation of the worm from outside the housing;
   (d) a lug on the worm gear radially spaced from the axis of rotation thereof so that rotation of the worm gear effects orbital movement of the lug about the axis of rotation of the worm gear;
   (e) a carriage within the housing and operatively connected to the lug on the worm wheel for reciprocatory movement in a direction perpendicular to the axis of rotation of the worm gear and on which a saw blade may be mounted;
   (f) a platen on the carriage projecting through the aperture in said housing to receive a saw blade thereon, said platen including a flat support surface having an outer perimeter, a spring-pressed detent projecting from the support surface and generally centrally disposed with respect to the perimeter thereof, a lock stud having a head portion and a shank portion on the platen adjacent the perimeter thereof, and a lock flange on the platen adjacent the perimeter thereof substantially diametrically opposed to the lock stud, said spring-pressed detent, lock stud and lock flange cooperating to lock a saw blade to the platen in a manner to prevent inadvertent disengagement thereof.

2. A drive mechanism for effecting reciprocation of a saber saw blade by converting rotary motion to controlled linearly directed reciprocatory motion of the saw blade comprising:
  (a) a housing;
  (b) a worm gear journaled for rotation within the housing about an axis of rotation;
  (c) a worm journaled for rotation within the housing about an axis perpendicular to the axis of rotation of the worm gear and meshed with the worm gear to effect rotation of the worm gear upon rotation of the worm from outside the housing;
  (d) a lug on the worm gear radially spaced from the axis of rotation thereof so that rotation of the worm gear effects orbital movement of the lug about the axis of rotation of the worm gear;
  (e) a carriage within the housing and operatively connected to the lug on the worm wheel for reciprocatory movement in a direction perpendicular to the axis of rotation of the worm gear and on which a saw blade may be mounted;
  (f) abutment means mounted on the housing for abutment against a work piece being sawed to guide the blade and prevent marring of the work piece; and
  (g) an extension of said abutment means projecting into the housing to form a support and guide rod therewithin, said carriage including a wheel journaled for rotation on the carriage and rollably disposed on the support and guide rod.

3. The combination according to claim 1, in which the platen is rotatably mounted on the carriage, and a lock lug is provided on the carriage normally biased into locking engagement with the platen to prevent rotation of the platen but permit selective release thereof when it is desired to effect rotation of the platen.

4. A drive mechanism for a saber saw blade having an aperture therethrough comprising:
  (a) a housing;
  (b) a worm gear journaled for rotation within the housing about an axis of rotation;
  (c) a worm journaled for rotation within the housing about an axis perpendicular to the axis of rotation of the worm gear and meshed with the worm gear to effect rotation of the worm gear upon rotation of the worm from outside the housing;
  (d) a lug on the worm gear radially spaced from the axis of rotation thereof so that rotation of the worm gear effects orbital movement of the lug about the axis of rotation of the worm gear;
  (e) a carriage within the housing and operatively connected to the lug on the worm gear for reciprocatory movement in a direction perpendicular to the axis of rotation of the worm gear, said carriage having means thereon for releasably securing the saber saw blade thereto, said securing means including a spring-biased lock pin for insertion into the aperture of the saber saw blade;
  (f) shield means mounted on the housing to cover a portion of a saw blade secured to the carriage outside the housing, said shield means having an aperture aligned with said lock pin; and
  (g) means shiftably mounted on said shield means and movable into and through the aperture of the shield means for engaging said lock pin and for moving the same out of the aperture of the saber saw blade to thereby permit release of the latter from the carriage.

5. A drive mechanism as set forth in claim 4, wherein said engaging and moving means includes a spring finger pivotally mounted on said shield means and having a lock-release portion spaced from the axis of pivotal movement thereof, said portion movable into alignment with the aperture in said shield means and through said aperture for engagement with said lock pin.

6. A drive mechanism as set forth in claim 5, wherein said lock-release portion extends laterally from said finger and decreases in transverse dimension as the outer end of the portion is approached.

7. A drive mechanism as set forth in claim 5, wherein said lock-release portion has a conical configuration, the apex of the portion being at the extremity thereof remote from said finger.

References Cited

UNITED STATES PATENTS

| | | | |
|---|---|---|---|
| 2,307,174 | 1/1943 | Wachs | 743—68(6)UX |
| 2,488,998 | 11/1949 | Turkowski | 143—68(5)X |
| 2,783,790 | 3/1957 | Keesling | 143—68(5) |
| 3,203,095 | 8/1965 | Nelson | 30—272(A) |

DONALD R. SCHRAN, Primary Examiner

U.S. Cl. X.R.

143—156